United States Patent [19]

Segawa et al.

[11] 4,147,243
[45] Apr. 3, 1979

[54] MULTI-SPEED TRANSMISSION HUB FOR A BICYCLE

[75] Inventors: Takashi Segawa; Seiji Fukui, both of Sakai, Japan

[73] Assignee: Shimano Industrial Company Limited, Osaka, Japan

[21] Appl. No.: 852,345

[22] Filed: Nov. 17, 1977

[30] Foreign Application Priority Data

Nov. 27, 1976 [JP] Japan .................. 51/142782
Nov. 27, 1976 [JP] Japan .................. 51/142781

[51] Int. Cl.² .................... F16H 3/44; F16D 67/00
[52] U.S. Cl. ........................... 192/6 A; 74/750 B
[58] Field of Search .......... 192/6 A; 74/750 B, 781 B

[56] References Cited

U.S. PATENT DOCUMENTS

| | | | |
|---|---|---|---|
| 3,122,226 | 2/1964 | Schuller et al. ............. | 192/6 A |
| 3,366,206 | 1/1968 | Shimano ................. | 74/750 B X |
| 3,608,683 | 9/1971 | Fujisawa ................. | 192/6 A |
| 3,670,856 | 6/1972 | Segawa ................. | 74/750 B X |
| 3,828,627 | 8/1974 | Schwerdhofer .......... | 192/6 A X |
| 3,973,451 | 8/1976 | Kine ..................... | 192/6 A X |

*Primary Examiner*—Lance W. Chandler
*Attorney, Agent, or Firm*—Stevens, Davis, Miller & Mosher

[57] ABSTRACT

A multi-speed transmission hub for a bicycle having a multiple speed-change mechanism and a braking mechanism which acts by back-pedalling, a ring gear for the speed-change mechanism which is provided with first transmitting pawls in mesh with first inner teeth formed at the inner surface of a hub shell and a clutch cone for the speed-change mechanism which is provided with second transmitting pawls in mesh with second inner teeth at the hub shell, and a rotor in mesh with the second inner teeth between the clutch cone and a gear frame of the speed-change mechanism.

3 Claims, 4 Drawing Figures

MULTI-SPEED TRANSMISSION HUB FOR A BICYCLE

This invention relates to a multi-speed transmission hub with a coaster brake.

Generally, this kind of hub comprises a shaft to a bicycle frame, a driving member supported normally or reversely rotatable with respect to a hub shell and the fixed shaft, a speed-change mechanism for transmitting the driving force from the driving member to the hub shell, and a braking mechanism for braking the hub shell by the reverse rotation of the driving member. The driving force is transmitted from the driving member normally rotated by pedaling to the hub shell at a given speed-change ratio through the speed-change mechanism to thereby drive the hub shell. Also, the driving member is reversely rotated by back-pedaling to actuate the braking mechanism through the speed-change mechanism thereby braking the hub shell.

A bicycle, which is provided with the aforesaid multi-speed transmission hub with a coaster brake, has the problem in that when the bicycle is moved backwardly the reverse rotation of the hub shell is transmitted to the braking mechanism through the speed-change mechanism so as to actuate the braking mechanism as previously done, thereby braking the hub shell to lead to a stoppage of rotation of the bicycle wheel.

Furthermore, a clutch cone for exerting the braking action by radially expanding brake shoes of the braking mechanism is screwed to a gear frame of the speed-change mechanism, so that the gear frame is reversely rotated to allow the clutch cone to be screwed forwardly, thereby radially expanding the brake shoes. Accordingly, there is also the problem in that when the gear frame is normally rotated, that is, the driving member is normally rotated to drive the hub shell, the clutch cone is screwed backwardly to a side of the gear frame and may lock, whereby the clutch cone is not quickly moved toward the brake shoes when exerting the braking action by reversely rotating the driving member, resulting in occurrence of the brake lagging.

On the other hand, the speed-change mechanism which comprising a sun gear at the fixed shaft, planetary gears in mesh with the sun gear, a gear frame supporting the planetary gears, and a ring gear with inner teeth in mesh with the planetary gears, so that the driving force from the driving member is relayed from a control member to one of the gear frame and ring gear and transmitted to the hub shell through transmitting pawls provided at the inner surface of the hub shell has the problem in that when the driving member is reversely rotated to stop the hub shell by actuating the braking mechanism, the transmitting pawls are fixated as meshed with ratchet teeth, so that, even when an attempt is made to normally rotate the driving member by pedaling for driving the bicycle forward, the hub shell is not rotatable in either direction due to no released braking action of the braking mechanism, so that the so-called locking phenomenon occurs.

In other words, the transmitting pawls, which are free from the ratchet teeth during the reverse rotation of the driving member, are kept meshed with the ratchet teeth when stopping the hub shell by reversely rotating the driving member. Under the conditions, the driving member, even when tried to be normally rotated, is not rotatable due to the gear frame being in a non-rotatable condition in connection with the active braking mechanism, and also the braking mechanism being unreleasable from its braking action.

In view of the aforesaid problems, the main object of the invention is to provide a multi-speed transmission hub with a coaster brake, simple in construction, free of braking lagging, and capable of exerting quick braking action, while, the hub is free from any braking action when the bicycle moves backwardly. Another object is to provide a multi-speed transmission hub with a coaster brake, which eliminates the possibility of brake locking.

The invention is characterized in that a clutch cone having a tapered face engageable with the brake shoes is screwed to the foremost end of the gear frame carrying the planetary gears. At the clutch cone are provided the second transmitting pawls which transmit the driving force from the gear frame to the hub shell when the gear frame is normally rotated and the reverse rotation of the hub shell to the gear frame when the hub shell is reversely rotated. Between the clutch cone and gear frame is insertably mounted a rotor rotatable always together with the hub shell so as to restrain the clutch cone from being moved toward the gear frame when the driving member is normally rotated and the hub shell is reversely rotated. The first transmitting pawls in mesh with the first inner teeth provided at the inner surface of the hub shell to transmit the driving force from the driving member to the hub shell, are urged by a spring in the direction of always meshing with the same. The transmitting pawls are made movable in a fixed range circumferentially with respect to a support for the pawls and are moved forwardly with respect to the support for exerting the braking action when the driving member is reversely rotated, while, moved backwardly when the driving member is normally rotated after completion of braking action, so that after the braking is released the driving force is transmitted to the hub shell.

These and other objects and advantages of the invention will be apparent from the details of a concrete construction in the following description in accordance with the accompanying drawings, in which.

Figure 1:
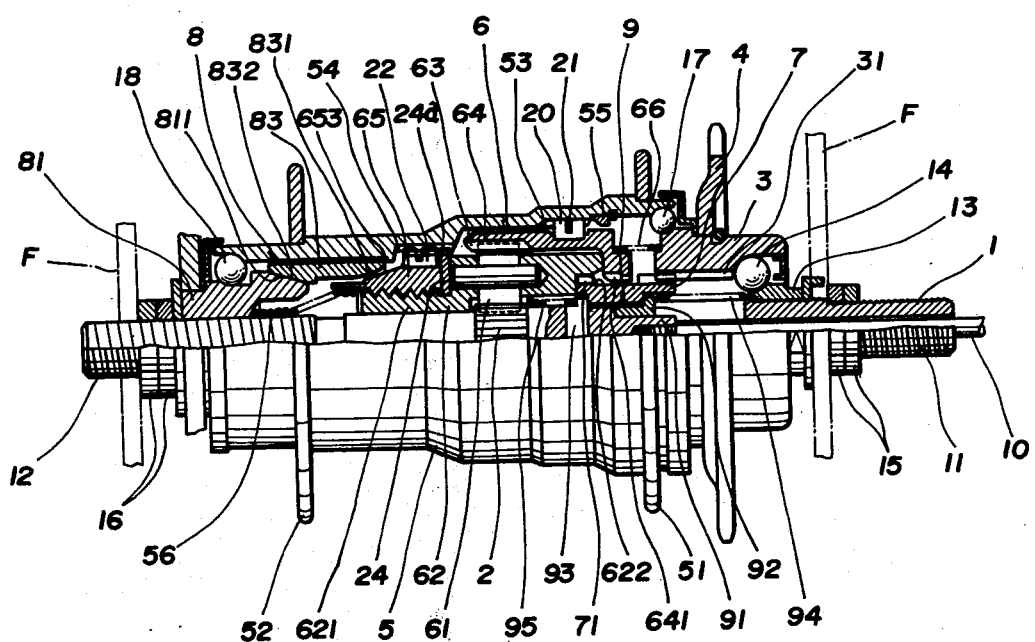
FIG. 1 is a partially cutaway front view of an embodiment of the invention.

In the drawings, a three-speed transmission hub capable of changing the speed at a high, middle and low stage, is shown. The hub comprises a fixed shaft 1 fixed to the bicycle frame, a sun gear 2 at the outer periphery of a substantially intermediate portion , a driving member 3 rotatably supported to the fixed shaft 1 a sprocket 4 at the outer periphery of the driving member 3, a hub shell 5 rotatably supported to the driving member 3, a speed-change mechanism 6 housed within the hub shell 5 so as to change the speed of driving force to be transmitted from the driving member 3 to the hub shell 5, a control member 7 for relaying the driving force from the driving member 3 to the speed-change mechanism 6, and a braking mechanism 8 acting to stop the rotation of hub shell when the driving member 3 is reversely rotated.

In greater detail, the fixed shaft 1 has at its ends screw threads 11 and 12, (at the right side in the drawings) and rotatably. A ball holder 13 is screwed onto thread 11 supports driving member 3 through balls 14. One end of shaft 1 is fixed to the bicycle frame F by means of a lock nut 15 screwed to the thread. Screw thread 12 (at the left side in the drawings) has screw to it a brake cone 81 constituting the braking mechanism 8. The left end of shaft 1 is secured to the bicycle frame F through a lock nut 16.

The driving member 3 is provided at its inner periphery with a ball race for the balls 4 and a spline 31 of a given length and at its outer periphery with a ball race for balls 17 which carry one axial end of the hub shell 5. Brake cone 81 has a ball race at its outer periphery for balls 18 which carry the other axial end of the hub shell 5. Thus hub shell 5 is rotatably supported through the balls 17 and 18.

The hub shell 5 has a pair of hub flanges 51 and 52 located on its outer periphery at axial both ends thereof and at its inner periphery first inner teeth 53 of a ratchet teeth shape, in mesh with the first middle and high speed transmitting pawls and second inner teeth 54 of the same shape, in mesh with the second low speed transmitting pawls, which will be hereinafter described.

The speed-change mechanism 6 housed within the hub shell 5 includes a gear frame 62 carrying therewith planetary gears 61 in mesh with the sun gear 2, and a ring gear 64 having inner teeth 63 in mesh with the planetary gears 61 and carrying the first middle and high speed transmitting pawls 20. The gear frame 62 extends at its left axial end toward the braking mechanism 8 to form a tubular extension 621. The extension 621 is provided at its outer periphery with a rough screw thread to which a clutch cone 65 is screwed. The clutch cone 65 carries the second low speed transmitting pawls. At the inner periphery of the right axial end of the gear frame 62 are provided teeth 622 engageable with engaging end portions 71 of the control member 7.

Figure 3:
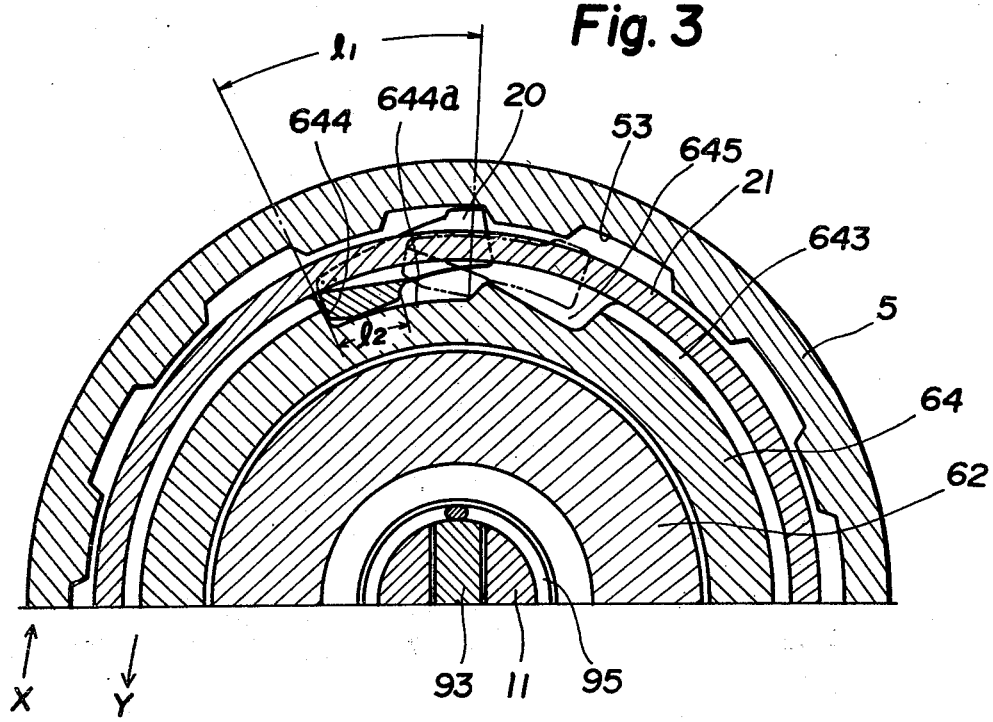
FIG. 3 is a sectional view taken on Line III—III in FIG. 2.

The ring gear 64 is axially movable and urged always away from the driving member by a spring inserted between the driving member and ring gear. Also, the inner periphery of the end of the ring gear 64 facing the driving member 3 is provided with teeth 641 engageable with the engaging end portions 71 of gear frame 62 and provided with stepped portions 642 at a side of one end of each of the engaging teeth 641. The stepped portions 642 are engageable with end faces of the engaging end portions 71. On the outer periphery of the ring gear 64, as shown in FIG. 3, are circumferentially formed an annular groove 643 accommodating therein a pawl spring 21, and two recesses 644 separated by 180° angle on the circumference along the annular groove 643. The recesses accommodate therein the first transmitting pawls 20. Each of the recesses 644 has on its bottom a sliding face 644a of a circular arc coaxial with the ring gear 64 as shown in FIG. 3. The sliding face 644a has a given circumferential length $l_1$.

The first transmitting pawls 20 are received into the recesses 644 and urged by a pawl spring of a ring-like shape positioned within the annular groove 643 so that the tips of pawls 20 always mesh with the first inner teeth 53.

Each of the first transmitting pawls 20 has a base of a length $l_2$, where $l_2$ is smaller than $l_1$. The length of slide of pawl 20 is $l_1 - l_2$. To be noted, L is made larger than the idling length of the second low speed transmitting pawls 22 with respect to the second inner teeth 54 in mesh therewith.

Referring to FIG. 3, the base of each of the pawls 20 is smaller in length ($l_2$) than the whole length of each pawl. A pawl receptacle 645 is formed adjacent to each of the recesses 644 so as to receive the tip of each of the first transmitting pawls 20.

Figure 4:
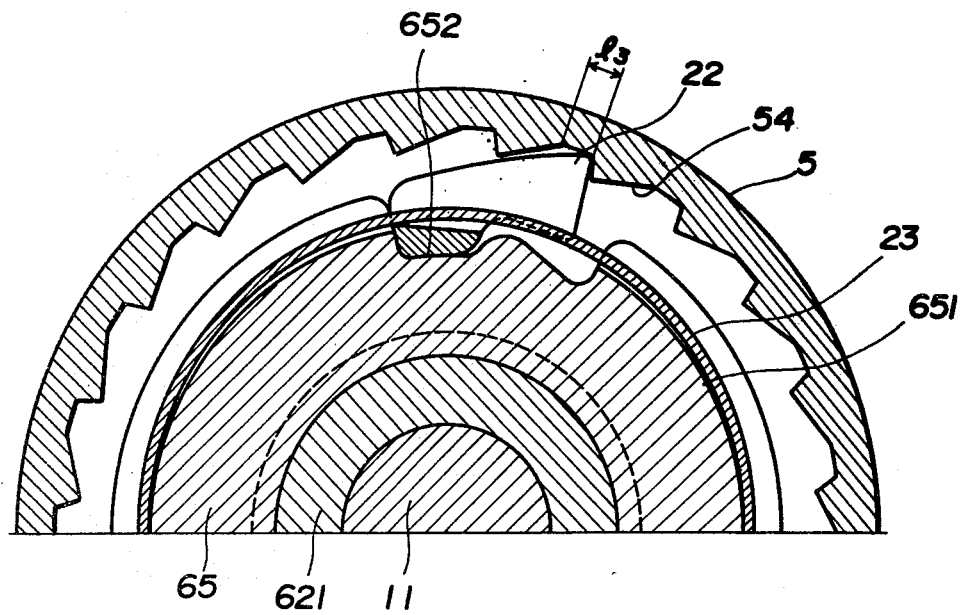
FIG. 4 is a sectional view taken on Line IV—IV in FIG. 2.

The clutch cone 65 is formed independently of the gear frame 62. On the outer periphery of the clutch cone 65, is circumferentially provided an annular groove 651 (FIG. 4) into which a pawl spring 23 is accommodated in the same way as in the ring gear 64, and two recesses 652 separated by 180° angle of the circumference along the annular groove 651. The recesses 652 accommodate therein the second low speed transmitting pawls 22 freely to raise or fall down. The pawl spring 23 allows the tips of the second transmitting pawls 22 to raise so as to be mesh with the second inner teeth 54. In this meshing, the idling length of the pawl 22 with respect to the teeth 54 is preferred to be as small as possible.

The clutch cone 65 has on its inner periphery screw threads screwed to the extension 621 of the gear frame 62, and on its outer periphery a tapered face 653 engageable with a tapered face 831 the brake shoes 83 on the braking mechanism 8. The clutch cone 65 is of such construction that it serves to transmit the driving force from the gear frame 62 to the hub shell 5 through the second transmitting pawls 22 when the gear frame is normally rotated, while, transmitting the reverse rotation of the hub shell to the gear frame when the hub shell is reversely rotated by moving the bicycle backwardly. Furthermore, the clutch cone 65 is screwed toward the braking mechanism 8 through the screws thread when exerting the braking action by back-pedaling, whereby the braking mechanism 8 acts to radially expand the brake shoes 83 for the braking action.

Between the clutch cone 65 and the gear frame 62 is inserted a rotor 24 having on its outer periphery teeth 24a engageable with the second inner teeth 54 of the hub shell 5 and rotating always together with the hub shell 5. The rotor 24 restrains the clutch cone 65 from moving toward the gear frame 62 when the driving member 3 is normally rotated and the hub shell 5 is reversely rotated.

The rotor 24 is made of a disc of a doughnut-like shape and is of sufficient thickness to check the movement of the end face of the clutch cone 65 toward the gear frame 62, before the thread of the clutch cone 65 cuts into the gear frame.

The braking mechanism 8 comprising the brake cone 81 and brake shoes 83 is well known. The brake cone 81 is provided on its outer periphery with a tapered face 811 engageable with the tapered face 832 of each of the brake shoes 83.

Figure 2:
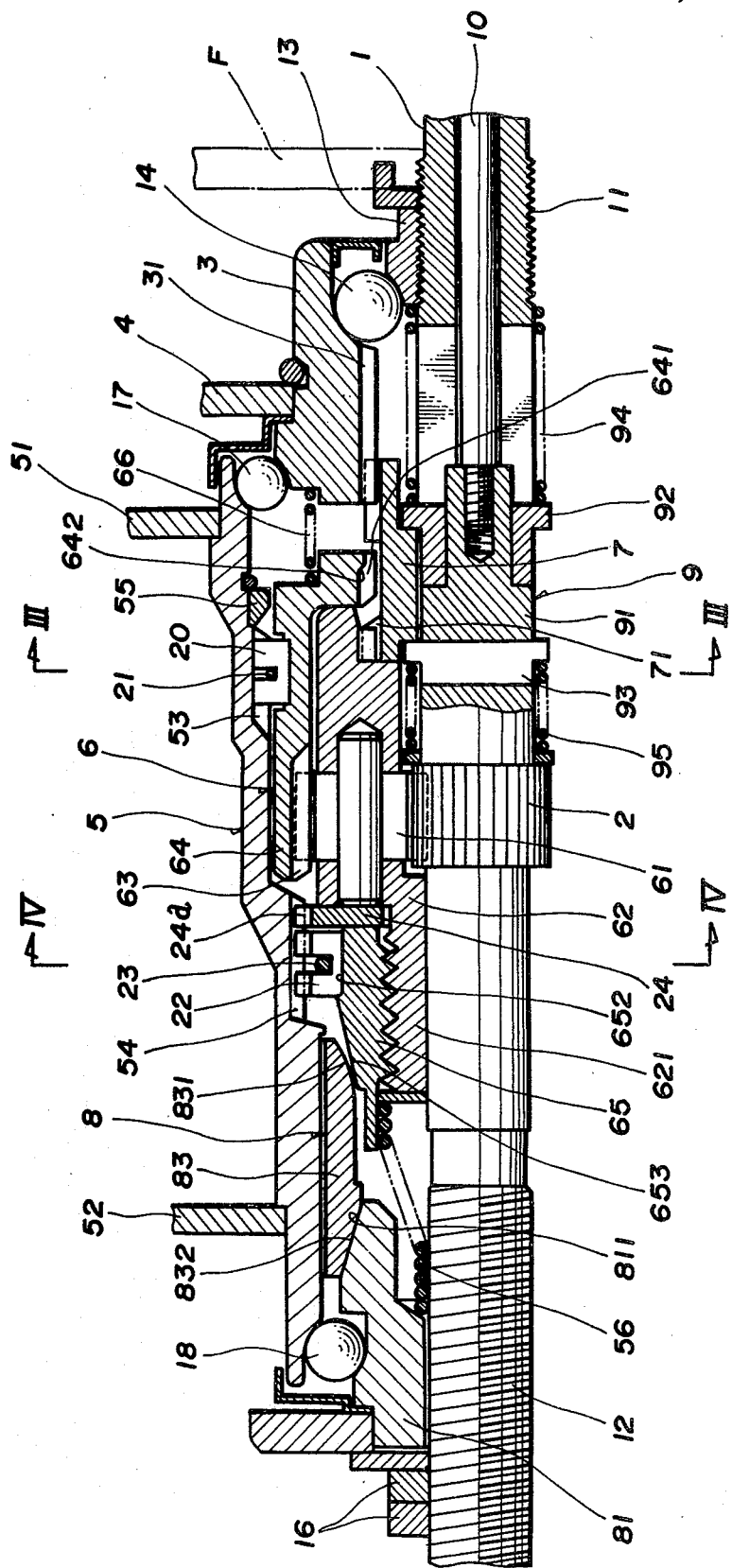
FIG. 2 is an enlarged view of the cutaway portion in FIG. 1.

In FIGS. 1 and 2, the reference numeral 9 designates a speed-change key for moving the control member 7. The key body 91 is connected to a rod 10 reciprocable in the central hollow of the fixed shaft 1, and has at both sides auxiliary keys 92 and 93, urged by springs 94 and 95, so that the rod 10 is moved rightward in FIGS. 1 and 2 to compress the spring 94, thereby moving the control member 7 rightward by the biasing force of the spring 95.

Reference numeral 55 designates a pawl-control ring attached to the inner surface of the hub shell 5 by means of snap ring. The pawl control ring 55 acts to prevent the first transmitting pawls from rising respectively when the ring gear 64 is moved rightward through the control member 7 at low speed drive. The reference numeral 56 designates a compression spring inserted between the brake cone 81 and clutch cone 65.

The hub shown in FIGS. 1 and 2 is an high speed drive, in which the engaging end portions 71 of the control member 7 are engaged with the teeth 622 of the gear frame 62.

Hence, the driving force transmitted from the driving member 3 is relayed from the control member 7 to the gear frame 62 and accelerated through the planetary gears 61 so as to be transmitted to the ring gear 64 through the inner teeth 63 and then to the teeth 53 of the hub shell 5 through the first middle and high speed transmitting pawls 20.

When the control member 7 is moved rightward in FIGS. 1 and 2 so as to allow portions 71 to be engage teeth 641 of ring rear 64, ring gear 64 is rotated at the rotary speed ratio of 1 to 1 with respect to the driving member 3, so that the driving force is transmitted is unchanged to the hub shell 5 through the first transmitting pawls 20, this performing the middle speed drive.

During the middle and high speed drive, the driving force transmitted to the clutch cone 65 from the gear frame 62 through the screw thread thereof is reduced in rotary speed to be smaller than that of the ring gear 64, and thus hub shell 5. Hence, the second low speed transmitting palws 22 are in a rise-and-fall motion, thus transmitting no driving force to the hub shell 5 through the second pawls 22. The clutch cone 65 also moves toward the gear frame 62 by means of the force therefrom, but is restrained from its movement by the rotor 24.

When the control member 7 is moved further rightward, the end faces of the engaging portions 71 abut against the stepped portions 642 so as to move the ring gear 64 rightward, whereby the control ring 55 restrains the first transmitting pawls 20 from meshing with the first inner teeth 53. Under this condition, the driving force is transmitted from the driving member 3 to the control member 7 and ring gear 64 and decelerated through the planetary gears 61 to be transmitted to the gear frame 62 and then to the hub shell 5 through the clutch cone 65 and second transmitting pawls 22, thus driving the hub shell at low speed.

During the low speed drive, the clutch cone 65 moves toward the gear frame 62, that is, rightward in FIGS. 1 and 2 by the normal rotation thereof. The rotor 24 prevents the thread of clutch cone 65 from encroaching into the gear frame 62. Hence, the clutch cone 65 is movably quickly leftward by the braking action to be hereinafter described.

In the aforesaid description, the driving member 3 is normally rotated to drive the hub shell 5.

When the bicycle is moved backward for changing its steering direction or taking it out from parking, the bicycle wheels are reversely rotated to actuate the hub shell 5 at the driving side. Hence, the reverse rotation in the direction of the arrow Y in FIG. 3 is transmitted from the second low speed transmitting pawls 22 to the clutch cone 65 and also from the first transmitting pawls 20 to the ring gear 64.

At this time, the clutch cone 65 is reversely rotated to be screwed toward the gear frame 62 so as to be integral therewith, resulting in the reverse rotation being transmitted directly to the gear frame through the screwably engaged portion therewith to thereby make the rotary speed of the ring gear 64 larger than that of the hub shell.

As a reuslt, the first transmitting pawls 20 are forwardly moved sliding on the sliding face 644a by the length L in the direction of the arrow X to reach the position shown by the phantom line in FIG. 3, at which time the pawls 20 are moving faster than the first inner teeth 53 so that they are pushed by the tops of the teeth against the pawl spring 21, and thus do not mesh therewith. They thereafter repeatedly only undulate, thus transmitting no reverse rotation to the ring gear 64. In this instance, the clutch cone 65 rotating in corporation with the gear frame 62 is not moved toward the brake shoes 83 due to the relative rotation therebetween, resulting in no braking action.

In the case where the bicycle is moved backwardly immediately after completion of the braking action, in other words, when the clutch cone 65 is in contact with the brake shoes 83, the clutch cone 65 is moved slightly by a spring 56 inserted between the brake cone 81 and the clutch cone 65 simultaneously with the release of the back-pedaling after completion of the braking action, and then is reversely rotated to move toward the gear frame 62. Also, the clutch cone 65 is integral with the gear frame 62 before the first transmitting pawls 20 already positioned as shown by the phantom line in FIG. 3 return to the position shown by the solid line, whereby the pawls 20, when returning, fall down as the same as aforegoing, thereby exerting no braking action during backward movement of the bicycle.

Furthermore, the aforesaid embodiment has the advantages such that the locking as aforegoing does not occur when braking the hub by back-pedaling in the bicycle's forward running other than eliminating the braking action when moving the bicycle backwardly.

Therefore, the braking action of the hub under any driving condition as aforegoing in the bicycle's running, can be carried out by back-pedaling, reversely rotating the driving member and gear frame 62, and then moving the clutch cone 65 leftwardly in FIGS. 1 and 2.

Under the aforesaid braking action, the hub shell 5 is normally rotated in the direction of the arrow X in FIG. 3, while, the ring gear 64 is rotating in the direction of Y, so that the first transmitting pawls 20 are slidably forwardly moved on the sliding face 644a of each of the recesses 644 and thereafter only repeatedly to undulate.

Furthermore, when starting to drive the hub shell after completion of the braking action, the first transmitting pawls 20, even in mesh with the first inner teeth 53, are movable backward from the position at the braking action by the length L as aforesaid, thereby normally rotating the driving member 3 for starting the drive. The length L is also made larger than the idling length $l_3$ of the second low speed transmitting pawls 22 with respect to the second inner teeth 54, so that the second transmitting pawls 22 are meshed with the inner teeth 54 prior to the completion of the backward movement of the first transmitting pawls 20 by the length L, thus enabling the hub shell to be driven. Also, the gear frame 62 is normally rotated to allow the clutch cone 65 to be rightwardly moved so as to be disconnected from the brake shoes, thereby releasing the braking action.

Therefore, there is no occurrence of the so-called locking phenomenon such that the first transmitting pawls 20 are fixed in mesh with the first inner teeth 53.

As clearly understood from the aforesaid description, the multi-speed transmission hub of the invention is so constituted that the clutch cone is provided with second transmitting pawls for transmitting the driving force from the gear frame to the hub shell when the gear frame is normally rotated, and from the hub shell to the gear frame when the hub shell is reversely rotated. Hence, when moving the bicycle backwardly, the first transmitting pawls are made inactive so that no reverse rotation is transmitted from the hub shell to the ring gear through the pawls. Thus the clutch cone is not moved toward the brake shoes, thereby eliminating the braking action therewith.

Furthermore, the rotor inserted between the clutch cone and gear frame is rotatable always together with the hub shell, so that the clutch cone may be prevented by the rotor from moving excessively toward the gear frame when the driving member is normally rotated or the hub shell is reversely rotated. Hence, the clutch cone is prevented from cutting into the gear frame and is quickly moved toward the brake shoes in the braking action to result in no occurrence of braking lag.

Also, the first transmitting pawls are made movable in a fixed range so as to move forward for the braking action when the driving member is reversely rotated, and backward to release the braking effect when normally rotated after completion of the braking action, thereby being meshed with the first inner teeth for driving the hub shell. Hence, the hub can eliminate locking by its simple construction during the braking action by reverse rotation. The elimination is reliable and does not malfunction.

While a preferred embodiment of the invention has been described using specific terms, such description is for illustrative purpose only, and it is to be understood that changes and variations may be made without departing from the spirit or scope of the following claims.

What is claimed is:

1. A multi-speed transmission hub for a bicycle, comprising:
   a fixed shaft;
   a driving member rotatably supported on said fixed shaft;
   a sprocket mounted on said driving member;
   a hub shell mounted with respect to said driving member in the relation of being rotatable therewith;
   a multiple speed-change mechanism housed within said hub shell so as to change the rotary speed of the driving force transmitted from said driving member to the hub shell;
   said speed-change mechanism comprising a sun gear provided on said fixed shaft, a gear frame having planetary gears in mesh with said sun gear, and a ring gear having inner teeth in mesh with said planetary gears;
   a clutch cone screwed to said gear frame;
   a control member for relaying the driving force from said driving member to said speed-change mechanism; and
   a braking mechanism acting to stop the rotation of said hub shell when said driving member is reversely rotated,
   said braking mechanism comprising brake shoes actuated by said clutch cone, and a brake cone for stopping the rotation of said brake shoes,
   said hub being provided with, two sets of first and second inner teeth and two sets of first and second transmitting pawls, and a rotary member inserted between said clutch cone and gear frame, said first transmitting pawls of said two sets of pawls being mounted to said ring gear so as to transmit the driving force therefrom to the hub shell when said driving member is normally rotated, said second transmitting pawls being mounted on said clutch cone so as to transmit the driving force from said gear frame to said hub shell when the driving member is normally rotated, and transmit the driving force from said hub shell to said gear frame when the hub shell is reversely rotated, said rotary member having at its outer periphery teeth in mesh with one of the two sets of inner teeth and being made rotatable always together with said hub shell, thereby restraining said clutch cone from being screwed toward said gear frame when the driving member is normally rotated and said hub shell is reversely rotated.

2. The multi-speed transmission hub for a bicycle according to claim 1, wherein each of said first transmitting pawls mounted to said ring gear is movable circumferentially thereof in a predetermined range with respect to said ring gear so that when exerting the braking action by the reverse rotation of said driving member said pawls move forward within said predetermined range, and when the driving member is normally rotated after completion of the braking action said pawls are moved backward, and after releasing the braking action the normal rotation of the hub shell is transmitted to said hub shell through said pawls.

3. The multi-speed transmission hub for a bicycle according to claim 2, wherein said range within which each of said first transmitting pawls is movable with respect to said ring gear, is made larger in length than each bottom land between the teeth of said inner teeth of the hub shell, in mesh with said first transmitting pawls, said bottom land being formed to idle the tip of each of said pawls.

* * * * *